Patented June 22, 1954

2,681,530

UNITED STATES PATENT OFFICE 2,681,530

GLASS FEEDER SHEARS EQUIPPED WITH CHARGE DROP GUIDING MEANS

Karl E. Peiler, West Hartford, Conn., assignor to Emhart Manufacturing Company, a corporation of Delaware Original application April 21, 1949, Serial No. 88,869. Divided and this application December 24, 1951, Serial No. 263,078

2 Claims. (Cl. 49—14)

1

This application is a division of my co-pending application, Serial No. 88,869, filed April 21, 1949, for an improvement in glass feeding apparatus. It is filed for the purpose of claiming the invention disclosed therein directed to the combination with severing means for severing mold charges from molten glass issuing downwardly from a glass discharge outlet into suspension therebelow of an improved charge guiding means associated with the severing means to prevent undesirable lateral deflection of the charges as they are severed.

An object of the invention is to provide for ready adjustment of a charge guide in either direction laterally of the direction of movement of a horizontally oscillated glass cutting shear blade with which the guide is mounted to move the adjustment of the guide being relative to the shear blade and without necessary interruption of the oscillatory movements of the blade or travel of the guide therewith.

A further object of the invention is to provide for fore-and-aft adjustment of the charge guide relative to the blade, this adjustment also being effectable during operation and in addition to the lateral adjustability of the guide.

Another object of the invention is to provide a charge guiding mechanism which includes independently adjustable guides operatively associated with the upper blades of two separate pairs of pivotally mounted shear blades, such as are used in "double gob" feeding operations, the individual guides being mounted to move with their respective associate blades and each being adjustable relative to its blade and during movement thereof either laterally in either direction or fore or aft in respect to the path of movement of the blade.

Other objects of the invention and advantages thereof will hereinafter be pointed out or appear from the following description of a practical embodiment of the invention as shown in the accompanying drawings. These drawings show the structures of Figs. 18, 21, and 23, respectively, of my aforesaid co-pending application, Serial No. 88,869, and the following specification consists of the pertinent portions of the specification of that parent application.

2

Figure 1:
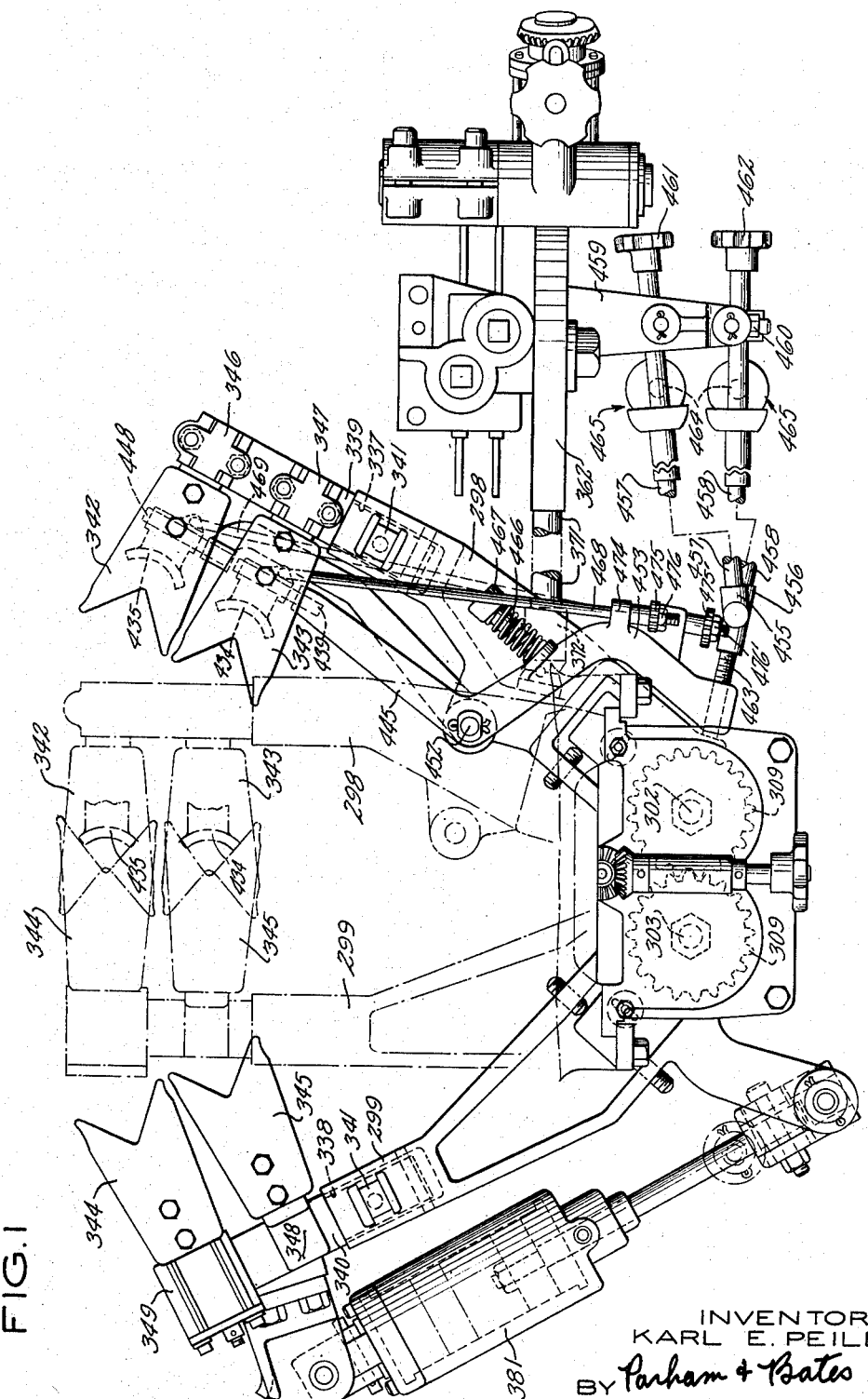
Fig. 1 is a plan view of the shears and charge drop guiding means.

The shear mechanism comprises a right hand, horizontally disposed shear arm 298 and a cooperative left hand shear arm 299, as viewed in Fig. 1. The shear arms 298 and 299 are pivotally mounted on vertical shear posts or spindles 302 and 303, respectively. When swinging movement is imparted to one of the shear arms the other will be correspondingly moved but in the opposite direction by reason of the action of the co-engaging gears 309.

The shear arms 298 and 299 are provided with open ended, longitudinal ways 337 and 338, respectively, in which end portions of the outer end sections or extensions 339 and 340, respectively, of such arms slidably fit. Fastening devices 341 secure the end sections to their shear arms in adjusted positions. These end sections 339, 340 carry the cooperative upper and lower shear blades, respectively. In the feeder construction as particularly described so far, the orifice ring is provided with two orifices for feeding a pair of glass charges simultaneously and the shearing mechanism has two pairs of cooperative upper and lower blades for shearing the charges produced. The upper shear blades are indicated at 342 and 343, respectively, and their cooperative lower shear blades 344 and 345, respectively. The blades 342 and 343 are mounted by holders 346 and 347 on the right hand shear arm end section 339. The front lower shear blade 345 which cooperates with the front upper shear blade 343, these being the shear blades nearest the hubs of the shear arms, is mounted by a holder 348 in a fixed position on the end section 340 of the left hand shear arm. The rear lower blade, 344, is mounted by a holder 349.

The longitudinal adjustments of the end sections 339 and 340 in their shear arms provide adjustment of the points of cutting of the shear blades when they are closed as indicated by the dot-and-dash lines in Fig. 1, these being predetermined to coincide with the axial lines of the respective orifices in the bottom of the feeder orifice ring. Also, this adjustment permits selective uses of the same shear mechanism with single and double orifice feeders. Thus, either the front or rear pair of shear blades could be positioned for use to sever glass which is provided in suspension from a single feed orifice.

The closing and opening movements of the shear arms are effected by suitable motion transmitting mechanism, including a shear cam 362 arranged to actuate a connecting rod 371 which is connected by a universal joint 372 to the right hand shear arm 298.

Preferably, an air spring mechanism 381, as shown in Fig. 1, is employed to cooperate with the connecting rod 371 in controlling the opening and closing movements of the shear blades. The air spring mechanism 381 does not, per se, form part of the present invention, but is disclosed in U. S. Patent No. 2,472,560 of June 7, 1949.

The shears are provided with associate drop guides cooperating with their blades during cutting to direct the severed charges properly toward the molds or other charge receivers and to prevent lateral batting of the upper ends of the severed charges between lower blades. The drop guide mechanism comprises a glass charge contacting guide member for the upper blade of each pair. The two charge guides thus provided are indicated at 434 and 435, respectively, in Fig. 1, being associated with the blades 343 and 342, respectively. The guides are adjustable independently toward the cutting axes of the respective pairs of shear blades, i. e., toward the vertical axial lines of the suspended glass columns from which charges are to be severed and hence along the paths of movement of the associate upper blades toward the cooperative lower blades. This adjustment will, for convenience, be termed a fore-and-aft adjustment. The drop guides also are independently adjustable laterally of the paths of movement of their associate blades toward the cooperative blades. These fore-and-aft and lateral adjustments may be effected during operation of the shears.

Figure 3:
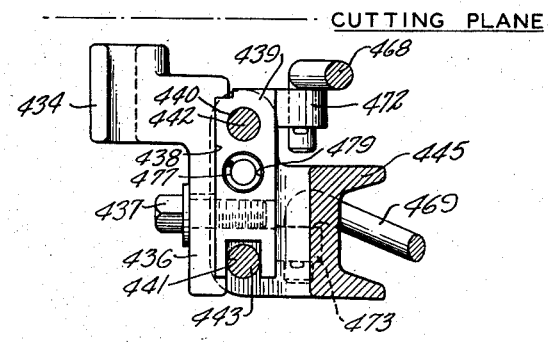
Fig. 3 is a section along the line 3—3 of Fig. 2.

The drop guides may be alike except for their association with different shear blades. The drop guide 434 is provided with an attaching portion 436 secured, as by a cap screw 437 and the groove-and-rabbet construction indicated at 438 to a carrier block 439, as best seen in Fig. 3. The carrier block 439 is provided with vertically spaced longitudinal guide passages in the form of an upper bore 440 and a lower slot 441 for slidably supporting it on vertically spaced horizontal guiding and supporting rods 442 and 443, respectively. These are fixed in and project from a head 444 on the outer end of a supporting arm 445. Similarly, the drop guide 435 has a rearward attaching portion, designated 446, mounted on a similar carrier block 447 which, like the block 439, is slidably mounted on a pair of vertically spaced guiding and supporting rods, designated 448 and 449, respectively, which project from a head 450 on the outer end of a supporting arm 451. The arm 445 may be curved or inclined upwardly from its head 444 sufficiently to enable such arm to be disposed mainly above the shear arm 298 while the arm 451 extends rearwardly along the same shear arm beneath it as appears from Fig. 1. These two drop guide arms are pivoted to the shear arm 298 by a vertical pivot pin 452, Fig. 1. Rearwardly of the pivot pin 452, the drop guide arms curve as shown at 453 for the arm 445 so that the rearward ends of such arms are positioned adjacent to the axis of oscillation of the shear arm 298. These rearward ends of the arms of the drop guides are there connected by universal joints 455 and 456, respectively, with adjusting rods 457 and 458 extending through and journalled in friction latch equipped suspension or hanger units 459 and 460 and terminate in separate handles 461 and 462. Turning these handles will turn threaded connections of the rods, one of which is indicated at 463 in Fig. 1, in threaded engagement with the rearward ends of the drop guide arms so as to swing the arms about their pivotal axes relative to the shear arm 298 and thus adjust the drop guides fore and aft, i. e., toward or away from the cutting axes of the associated pairs of shear blades. In order to permit this adjustment to be made from a lower level, as from the factory floor, each of the rods 457 or 458 may be provided with a remote control adjusting attachment 464 having a driving connection therewith, as generally indicated at 465, Fig. 1.

A coil spring, such as indicated at 466, Fig. 1, is interposed between the rearward portion 453 of the drop guide supporting lever 445 and a lug 467 on the shear arm 298 so as to tend to urge the drop guide 434 continuously away from the cutting axis and also to exert tension on the adjusting rod 458. A similar arrangement is provided beneath the shear arm 298 for the lower drop guide arm.

Figure 2:
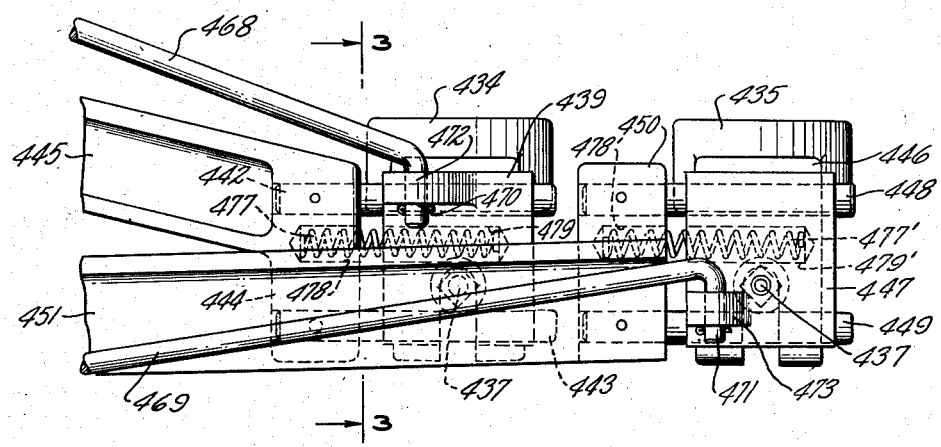
Fig. 2 is a somewhat enlarged fragmentary elevation of the charge drop guides associated with the right hand shear arm as shown in Fig. 1.

Lateral adjustments of the drop guides may be effected by longitudinal movement of rods 468 and 469, Figs. 1 and 2 which respectively have downturned outer end portions pivotally connected at 470 and 471, respectively, with attaching ears 472 and 473, respectively, on the carrier blocks 439 and 447, respectively. The rods 468 and 469 extend slidably through apertured ears such as that indicated at 474 for the upper rod 468 in Fig. 1, this ear being integral with a rearward end portion of the supporting lever for the drop guide. A handle 475 bears against the rearward face of the ear 474 and has a nut portion 476 in threaded engagement with the extreme rearward end portion of the rod 468. By turning the handle in one direction or the other the rod 468 will be advanced or retracted. The rod 469 is provided with a similar handle, designated 475', having an integral nut portion 476'. Each of the carrier blocks is continuously urged away from the head of its supporting arm by an intervening coil spring 477 or 477', Fig. 2, having its rearward end portion seated in a pocket or recess 478 or 478' in the head of the carrying arm and its opposite end portion seated in an opposed pocket or recess 479 or 479' in the carrier block. Thus, when the adjusting rod 468 is advanced, the spring 477 will slide the carrier block 439 outwardly on the guiding and supporting rods 442 and 443 and thus effect a lateral adjustment of the drop guide 434 in one direction. When the rod 468 is retracted, a lateral adjustment of the drop guide 434 in the opposite direction will be effected against the action of the spring 477. The arrangement is the same for laterally adjusting the drop guide 435.

I claim:

1. In glass feeding apparatus having a downwardly opening glass discharge outlet from which molten glass issues and accumulates in a suspended column and having severing means including a horizontally oscillated pivotally mounted blade for severing a mold charge from the suspended column at the axis thereof each time said blade is moved from a retracted position from one side of the column across the axis of said column, a charge guide, means for mounting the guide so that it will move with the pivotally mounted blade and so that it is adjustable laterally of the movement of the blade in either direction, adjusting means operable during swinging movements of said blade to effect said lateral adjustment of the charge guide, said means for mounting the guide so that it will move with the pivotally mounted blade being constructed and arranged to permit adjustment of the guide fore or aft in relation to the blade, and adjusting means operable during swinging movements of said blade to effect such a fore or aft adjustment of the guide.

2. In glass feeding apparatus having a pair of cooperative shear blades and pivoted shear arms carrying said blades for moving them periodically to overlapping relation for severing mold charges from the molten glass that has issued downwardly from a discharge outlet and for retracting the shear blades in the intervals between successive severing operations, a charge guide lever pivoted intermediately on the shear arm for the uppermost of the overlapping blades, a charge guide mounted on the outer end of said charge guide lever for lateral adjustment in the direction of length of said lever, said guide being located below said uppermost blade, spring means acting on said guide tending to urge it laterally in one direction relative to its supporting lever, a rigid rod operatively connected at one end to said guide and at its opposite end to the inner end portion of the charge guide lever relatively adjacent to the axis of oscillation of the supporting shear arm, said rod being manually operable during operation of the shear blades to coact with said spring to adjust the charge guide laterally, spring means interposed between the inner end portion of the charge guide lever and its supporting shear arm tending to swing said charge guide lever in one direction about its pivotal axis to move the charge guide in a fore or aft direction, and manually operable means connected to the inner end of the charge guide lever relatively adjacent to the pivotal axis of the supporting shear arm to effect an angular adjustment of the charge guide lever about its pivotal axis on the shear arm in opposition to the action of said spring so as to determine the fore or aft adjustment of the charge guide, said last named means being operable during operation of the shear blades.

References Cited in the file of this patent

UNITED STATES PATENTS

| Number | Name | Date |
|--------|------|------|
| 1,950,339 | Barker, Jr. | Mar. 6, 1934 |
| 2,245,813 | Pearson | June 17, 1941 |
| 2,412,268 | Honiss | Dec. 10, 1946 |